United States Patent [19]

Fowler, Jr.

[11] 4,281,764
[45] Aug. 4, 1981

[54] SORTING APPARATUS FOR POTATOES AND THE LIKE

[75] Inventor: William E. Fowler, Jr., Albany, Ga.

[73] Assignee: FMC Corporation, San Jose, Calif.

[21] Appl. No.: 117,429

[22] Filed: Feb. 1, 1980

[51] Int. Cl.³ .............................................. B07C 5/00
[52] U.S. Cl. ..................................... 209/557; 209/587;
209/631; 209/632; 209/638; 209/657; 209/665;
198/688; 198/445; 209/539
[58] Field of Search ............... 198/688, 848, 844, 445,
198/446; 209/557, 586, 587, 631, 632, 638, 657,
665, 540, 545, 539; 171/126; 56/16.5

[56] References Cited

U.S. PATENT DOCUMENTS

| 2,587,686 | 3/1952 | Berry | 209/557 |
|---|---|---|---|
| 2,675,917 | 4/1954 | Powers | 209/545 |
| 2,896,728 | 7/1959 | Pridy | 171/130 |
| 3,339,712 | 9/1967 | Anderson | 198/848 |
| 3,679,050 | 7/1972 | Anderson | 198/688 |
| 3,794,161 | 2/1974 | Peterson | 209/540 |
| 3,975,262 | 8/1976 | Sherwood | 209/564 |
| 4,081,362 | 3/1978 | Chamberlin | 209/638 |

FOREIGN PATENT DOCUMENTS 964464  8/1950  France .

Primary Examiner—Allen N. Knowles
Attorney, Agent, or Firm—R. S. Kelly

[57] ABSTRACT

An improved sorting apparatus for separating loose debris, rocks and clods of dirt from root crops such as potatoes includes a channelizing conveyor, a take-away conveyor having an inlet end positioned below the discharge end of the channelizing conveyor, and a plurality of diverter paddles aligned with the channels of the channelizing conveyor. The channelizing conveyor includes an endless series of segments, each segment comprising a bar having hook portions at the ends thereof and an elastomeric molding formed thereon. Each molding includes several uniformly spaced, wedge-shaped projections, and the projections are longitudinally aligned to form channels for the potatoes, rocks and clods. The segments are interconnected with the hook portions thereof being engaged upon the trailing segment. With such manner of interconnection, as a segment moves from top-dead-center position on the sprockets at the discharge end of the conveyor through an arcuate path corresponding to the tooth pitch of the sprockets, the molding projections rock rearwardly relative to the axis of the bar in its arcuate path of travel.

4 Claims, 4 Drawing Figures

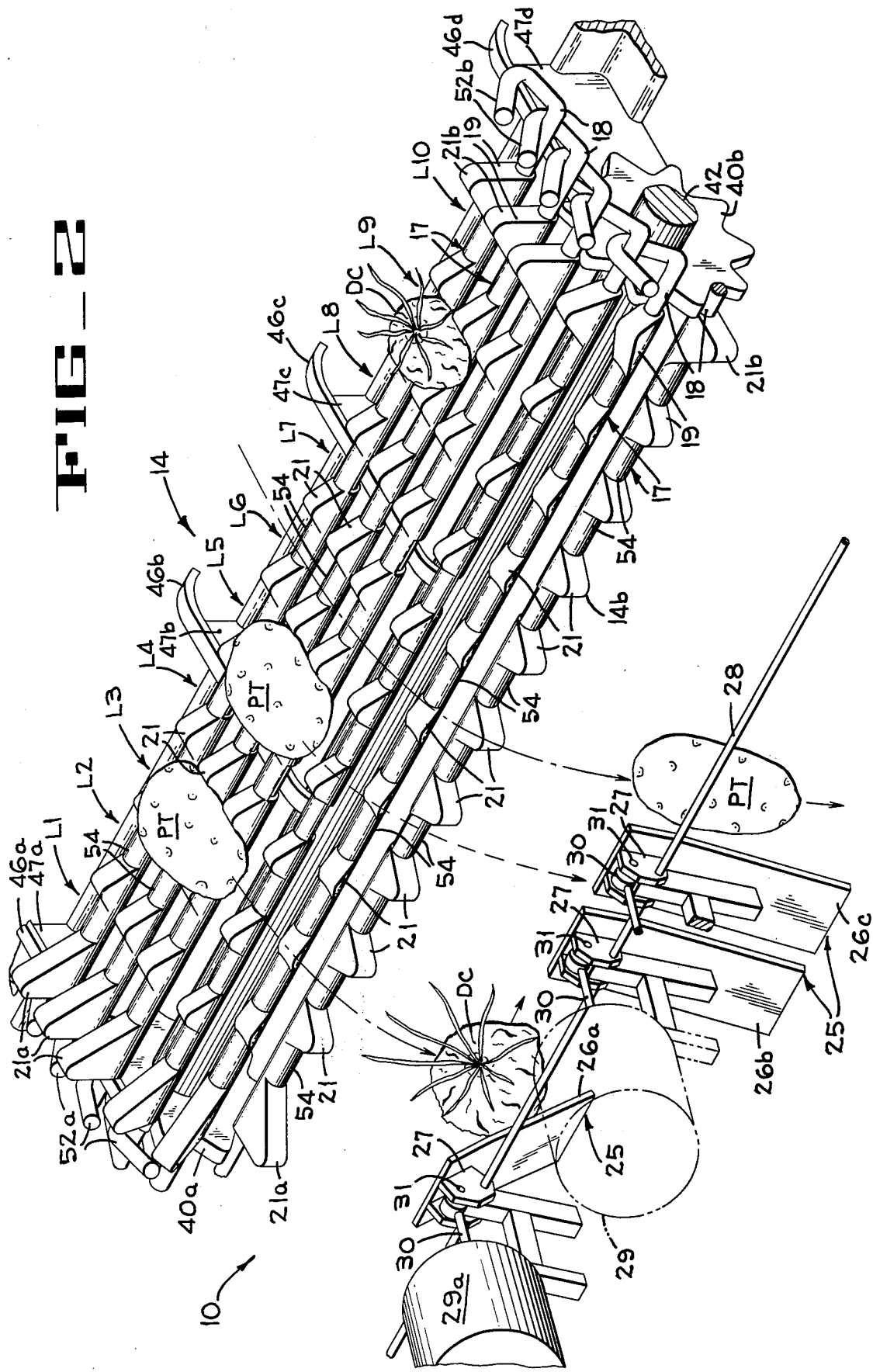
FIG_2

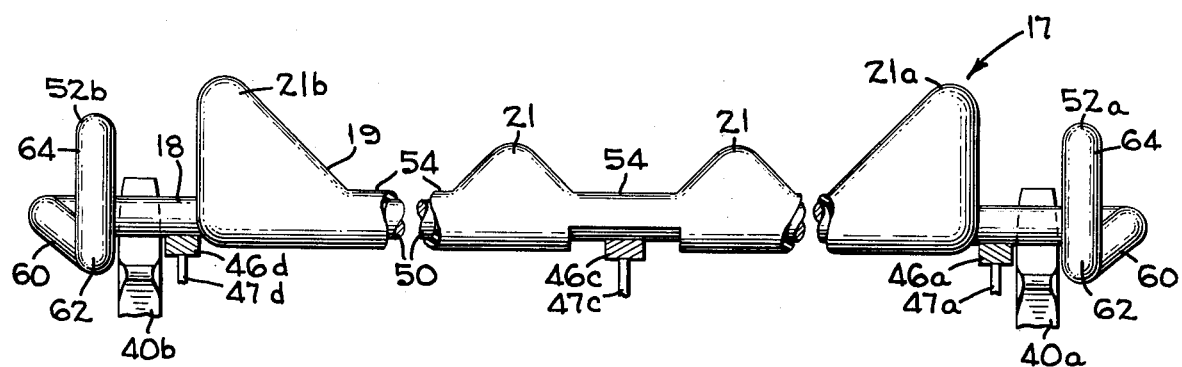
FIG_3
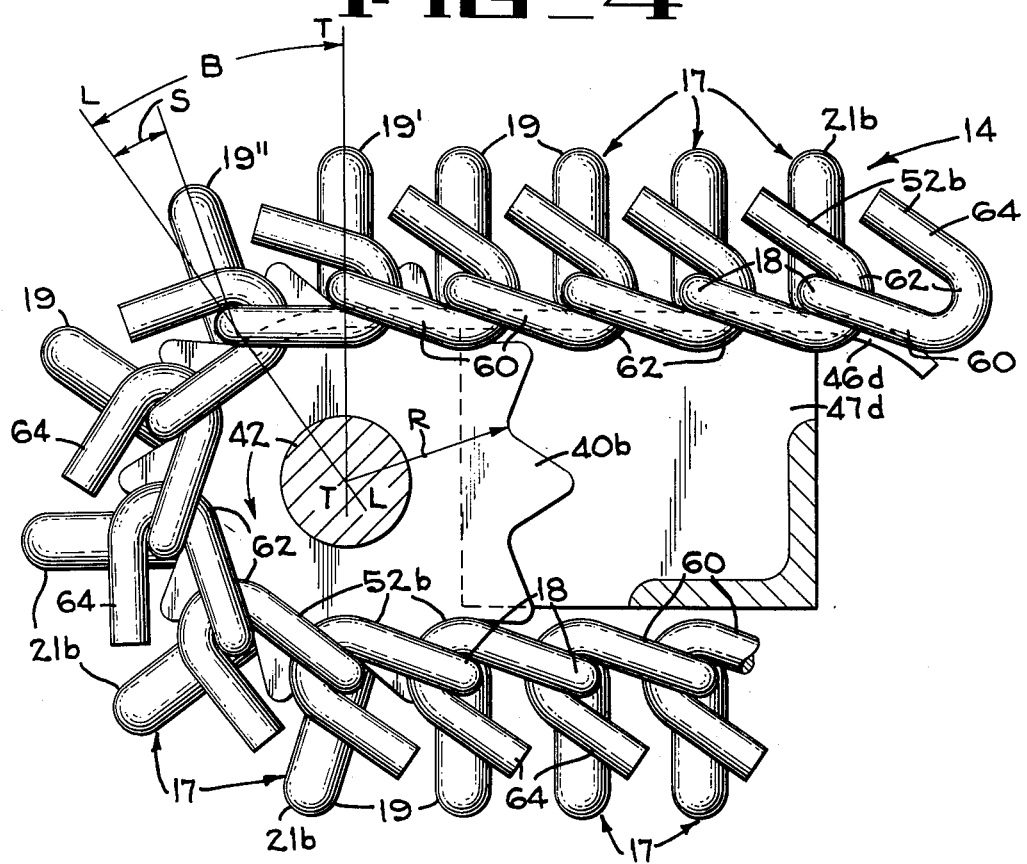
FIG_4

SORTING APPARATUS FOR POTATOES AND THE LIKE

BACKGROUND OF THE INVENTION

1. Field of the Invention

The present invention generally relates to apparatus for sorting objects, and in particular, the present invention relates to an improved sorting apparatus for separating dirt clods, rocks and small debris from root crops such as potatoes.

2. Description of the Prior Art

U.S. Pat. No. 4,081,362 to Chamberlin et al discloses a sorting apparatus for sorting red tomatoes from green or cull tomatoes that includes a solid belt conveyor having a number of longitudinally extending ribs which are uniformly transversely spaced to provide channels for receiving and channelizing tomatoes to be sorted. The tomatoes are ejected from the discharge end of such channelizing conveyor through predetermined trajectories so that the tomatoes fall onto a take-away conveyor which is disposed below and somewhat downstream from the discharge end of the channelizing conveyor. The Chamberlin et al sorting apparatus further includes a number of paddles which are pivotally mounted at positions adjacent the discharge end of the channelizing conveyor, with such paddles being aligned with the lanes of the channelizing conveyor. Each paddle is operated by a solenoid which swings the paddle between an extended position projecting into the trajectory of a tomato from an associated lane of the channelizing conveyor and a retracted position which is cleared from such trajectory. Photodetector units are provided for each lane, and each unit includes a photocell arranged to view the tomato between the respective paddle and the discharge end of the channelizing conveyor. When a green tomato is detected, a solenoid is energized to extend the associated paddle into the trajectory of the green tomato to divert it from its normal trajectory so that it falls onto the take-away conveyor.

While the sorting apparatus of the aforesaid Chamberlin et al patent has been proven to be generally satisfactory for sorting tomatoes, it has a number of disadvantages when employed to separate rocks, dirt clods and loose debris from root crops such as potatoes. The solid belt type of channelizing conveyor disclosed in this patent does not permit the separation of loose debris, such as very small rocks and clods, from the larger potatoes, rocks and clods fed to such belt. Thus, such debris would be flung with the potatoes and the other material toward the photocells and paddle assemblies, thereby contaminating such parts to thereby require more frequent cleaning and maintenance. Also, the belt type of conveyor may stretch substantially after prolonged use, thus requiring appropriate field adjustments.

As illustrated in U.S. Pat. No. 2,896,728 to Pridy, potato harvesters have for many years employed segmented conveyors comprised of an endless series of bars which are spaced in the direction of travel to permit loose debris, small rocks and small dirt clods to fall between the bars while containing to support larger potatoes thereon. Such conveyors, which are known in the art as "potato chain conveyors," include bars having straight portions which extend transversely of the direction of travel of the chain and which have hook portions at their ends that are pivotally engaged upon the ends of the straight portion of the leading adjacent bar (the term "leading" as used herein, signifies the upstream one of each pair of adjacent bars). That is, the hook portions of each bar lead the straight portion thereof as they travel across the upper reach of the potato chain conveyor.

Anderson et al, U.S. Pat. No. 3,679,050 discloses a segmented bar type of conveyor adapted for use in a potato harvester wherein each of the bars has a molding formed thereon. Each molding has a number of upstanding, resilient, finger-like projections uniformly spaced therealong, and the projections of adjacent bars are arranged in a staggered relation with respect to one another. The projections are so transversely spaced in the direction of travel such that the projections of adjacent bars hold the potatoes with their long axes extending transversely of the direction of travel of the conveyor. As in other known prior art potato chain conveyors, such as described hereinbefore in connection with the Pridy et al patent, each conveyor bar has a straight portion and hook portions at the ends of the straight portion, and the hook portions are interconnected with the straight portion of the adjacent leading bar such that the straight portions of the bars trail behind their hook portions. A segmented conveyor that is somewhat similar to that disclosed in the Anderson et al U.S. Pat. No. 3,679,050 patent is shown in French Pat. No. 964,464 published in Aug., 1950. This French patent discloses a segmented chain conveyor including moldings on the chain bars. The moldings include spaced cylindrical abutments, and the abutments are staggered with respect to the abutments on the adjacent bars of the conveyor.

U.S. Pat. No. 3,975,262 to Sherwood discloses a synchronized produce sorting system adapted to sort potatoes which includes a channelizing conveyor comprised of convoluted rollers, photodetectors upstream from the discharge end of the roller conveyor, and air ejectors situated adjacent the discharge end of the roller conveyor. The rollers are mounted to form pockets between successive rollers to channelize the potatoes, rocks and clods in transversely spaced, single files that are aligned with the photodetectors and air ejectors.

U.S. Pat. No. 3,794,161 to Peterson discloses a potato cutting machine which also employs a conveyor comprised of convoluted rollers adapted to channelize potatoes that are fed to the upstream end thereof. As shown in this patent, the rotation of the rollers causes the potatoes to turn and fall lengthwise between the adjacent rollers such that the long axes of the potatoes extend transversely of the direction of travel of the roller conveyor.

SUMMARY OF THE INVENTION

According to the present invention, an improved sorting apparatus for separating rocks and clods of dirt from potatoes includes a channelizing conveyor, a receiving area positioned below the discharge end of the channelizing conveyor, and diverters at the discharge end of the conveyor that are aligned with the channels of the channelizing conveyor for deflecting rocks and dirt clods ejected from the channelizing conveyor away from the receiving area. The channelizing conveyor is comprised of an endless series of interconnected bars entrained on sprockets, and each bar has hook portions at the ends thereof and a molding formed thereon. Each molding includes uniformly spaced projections which are longitudinally aligned to form channels for the potatoes, rocks and clods and which project upwardly at a selected orientation in the upper reach of the conveyor. The bars are interconnected with the hook portions of each bar being engaged upon the trailing bar so that until a bar reaches the top-dead-center position of the sprockets at the discharge end of the conveyor, the molding projections remain in their selected upright orientation.

BRIEF DESCRIPTION OF THE DRAWINGS

FIG. 2 is an enlarged, fragmentary, isometric view illustrating the discharge end of the channelizing conveyor and the paddle assemblies of the sorting apparatus.

FIG. 3 is an enlarged rear end elevation, which is partially broken away, of one of the segments of the channelizing conveyor.

FIG. 4 is an enlarged, fragmentary, side elevation that better illustrates the motion of the molded wedges on the interlinked segments as they approach and are carried over the sprockets at the discharge end of the channelizing conveyor.

DESCRIPTION OF THE PREFERRED EMBODIMENT

Figure 1:
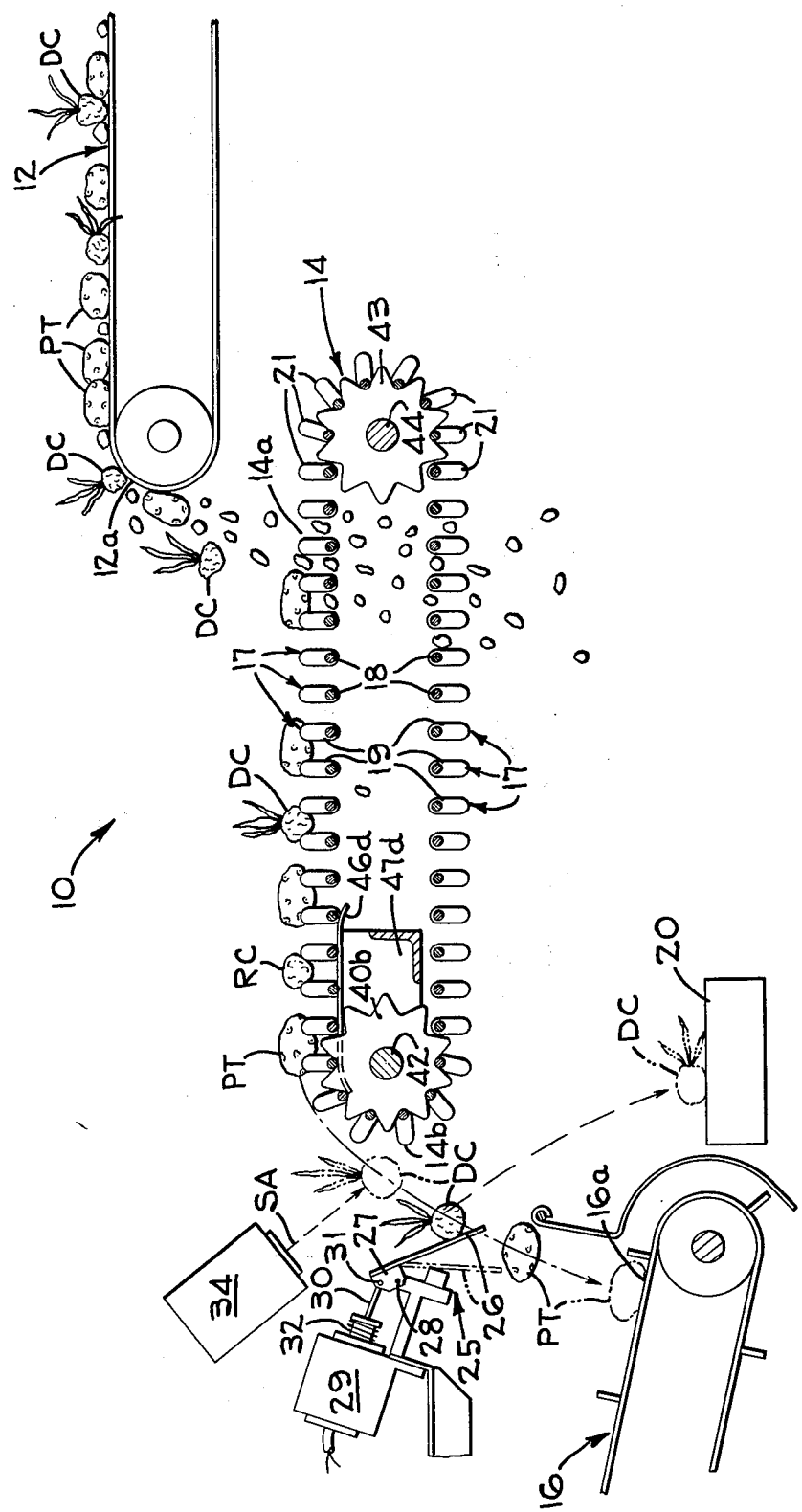
FIG. 1 is a diagrammatic side elevation in partial section of the improved sorting apparatus that is adapted to separate rocks, dirt clods and loose debris from potatoes.

As shown in FIG. 1, an improved sorting apparatus 10 for separating loose debris, rocks and dirt clods from potatoes includes a supply conveyor 12, a horizontal channelizing conveyor 14 having its inlet end 14a disposed below discharge end 12a of the supply conveyor 12, and an upwardly inclined take-away conveyor 16 having its inlet end 16a disposed generally below but horizontally off-set from the discharge end 14b of the channelizing conveyor 14 for receiving potatoes from the channelizing conveyor. The sorting apparatus is arranged to be mounted upon a potato harvester (not shown). The potatoes fed to the take-away conveyor 16 are eventually fed to a conveyor which deposits them in a storage bin. The rocks and clods separated by the apparatus fall onto a cull conveyor 20 which deposits the rocks and clods onto the ground.

As will be described in detail hereinafter, the channelizing conveyor of the present invention 14 is comprised of a plurality of interconnected segments 17 which include metal bars 18 and contoured rubber moldings 19 formed thereon. As depicted in FIG. 2, all the moldings are identical and each molding includes eleven wedge-shaped projections, or wedges, 21 which are uniformly spaced along its length with the wedges 21a, 21b at the ends of the segment being of greater size as shown (FIG. 2). The moldings are mounted on the bars so that the wedges of successive segments are aligned in the direction of travel to provide ten lanes L1–L10 into which the potatoes, dirt clods and rocks are channelized.

The larger dirt clods DC and rocks RC (FIG. 1) are separated from the potatoes PT by ten paddle assemblies 25 which are mounted at positions between the discharge end 14b of the channelizing conveyor 14 and the inlet end 16a of the take-away conveyor 16 in uniformly transversely spaced relationships aligned with the lanes L1–L10. Each paddle assembly 25 includes a paddle 26 mounted on a bracket 27 which, in turn, is pivotally supported on a common rod 28 (FIG. 2). Each paddle is adapted to be swung between an extended position (which is shown in solid outline in FIG. 1) and a retracted position (illustrated in phantom outline in FIG. 1). The extended position is also shown in FIG. 2 with respect to the paddle 26a aligned with lane L3, and the retracted position is illustrated therein with respect to paddles 26b and 26c aligned with lanes L5 and L6, respectively. The paddles are swung between their retracted and extended positions by solenoid units 29 which have their armatures 30 operatively connected to the respective paddles by pins 31 mounted to the respective brackets 27. In FIG. 2, one solenoid unit 29a is shown with its armature retracted so as to swing the paddle 26a into its extended position, and another solenoid unit 29 is shown (in phantom lines) as holding the paddle 26b in its retracted position.

Ten photoelectric detectors 34 (only one detector being shown in FIG. 1) are disposed to receive reflected light from the objects between the discharge end 14b of the channelizing conveyor and the paddle assemblies 25. The paddle assemblies 25, the photoelectric detectors 34 and the control circuitry therefor (not shown) are fully described in the aforementioned Chamberlin et al U.S. Pat. No. 4,081,362, and reference is made thereto for a detailed description of these elements. Generally, the photodetectors 34 include an arrangement of two photocells appropriately filtered to receive light of different wavelengths and a beam splitter which divides the received light to the photocells and which is oriented along a sight axis SA to view the dirt clods, rocks and potatoes in their trajectories from the discharge end of the channelizing conveyor. By comparing the relative amounts of light received by the individual photocells, the characteristic color of the viewed object is determined, and the control circuitry provides a signal to operate the appropriate solenoid unit 29 when the characteristic color is observed (in this case, the characteristic color of the potato). The armatures of the solenoids are outwardly biased by springs 32 (FIG. 1) to urge the paddles toward their retracted positions. The associated control circuits are each adapted to provide a normally operative reject signal to energize the associated solenoids with a relatively large current so as to quickly retract the associated armature against the spring and to hold the paddle in its extended position to divert a rock or clod from its trajectory toward the take-away conveyor 16. When a potato is sensed in the viewing area of a photodetector 34, the signal from the control circuitry de-energizes the solenoid to permit the spring 32 to quickly swing the paddle to its retracted position, hence allowing the sensed potato to continue along its trajectory and to fall onto the take-away conveyor.

The present invention relates to the structure of the channelizing conveyor 14 which permits small debris to be separated from the potatoes, rocks and dirt clods before their discharge from the conveyor, while channelizing the potatoes, rocks and dirt clods into ten lanes so that they are aligned with the associated discharge paddles 26. The channelizing conveyor discharges the rocks, dirt clods and potatoes from such lanes through relatively uniform trajectories. The conveyor 14, as previously stated, is a bar type of conveyor comprised of an endless chain of interlinked segments 17. As illustrated in FIGS. 1 and 2, one end of the endless chain of segments is entrained at its side margins upon a pair of drive sprockets 40a and 40b mounted upon a drive shaft 42 at the discharge end 14b of the conveyor (FIG. 2). A pair of idler sprockets 43 (one only shown in FIG. 1) mounted on a shaft 44 support the inlet end 14a of the conveyor (FIG. 1). The shafts 42 and 44 are mounted in a conventional manner to the support frame (not illustrated) of the potato harvester to cause the upper reach of the conveyor to move in a horizontal plane. Several idler rollers (not shown) are positioned at various longitudinal positions below the upper reach of the conveyor. Referring to FIGS. 2 and 3, four transversely spaced slide bars 46a–46d are mounted on support plates 47a–47d at the discharge end of the conveyor. These slide bars support the conveyor segments as they approach and transverse the top-dead-center position of the drive sprocket 40a and 40b, as hereinafter described in more detail. The upstream ends of the slide bars are curved to smoothly lift the segments of the conveyor onto the horizontal straight sections of the slide bars, and the downstream ends are curved along a radius approximately equal to the radius R (FIG. 4) of the valleys of the sprockets 40a and 40b. Suitable means (not shown) is provided for continuously driving the shaft 42, such as a hydraulic motor operatively connected thereto by a sprocket and drive chain arrangement.

As previously stated and as shown in FIGS. 2 and 3, each of the conveyor segments 17 is comprised of a metal bar 18 and a rubber molding 19 formed on the bar. Each metal bar has an identical shape including a straight portion 50 and hook portions 52a and 52b at the ends of the straight portion. As illustrated in FIGS. 2 and 3, each molding 19 is formed on the straight section of the bar and includes nine uniformly spaced, triangular wedges 21 having sloped side surfaces and flat front and rear surfaces and a pair of end wedges 21a, 21b of larger size each having a sloping inner side surface and a generally vertical outer side surface. The moldings are formed on the bars so that the wedges project vertically upwardly in the upper reach of the conveyor. The inclined side surfaces of the wedges are rounded and are spaced by a distance equal to the average diameter of the potatoes to be sorted to thereby facilitate the orientation of the potatoes so that their long axes are parallel to their direction of travel, as shown with respect to potatoes PT in FIG. 2. Cylindrical spacer portions 54 of uniform lengths are disposed between the wedges. The wedges 21a and 21b at the ends of the moldings are relatively larger as mentioned hereinbefore, and such end wedges are inwardly spaced from the hook portions 52a, 52b so that the ends of the bars 18 can slide on the end slide bars 46a and 46d (FIG. 2). As already stated, the moldings of the respective segments of the conveyor 14 are of identical configurations and are mounted on the straight portions of the bars such that the wedges are all longitudinally aligned to thereby provide the channels L1 through L10.

As shown in FIGS. 3 and 4, the hook portions 52a and 52b have a U-shaped configuration in end elevation. Each hook portion includes a straight lower portion 60 which, in the upper reach of the conveyor, extends inwardly and downwardly from the end of the straight portion 50 (FIG. 3), a curved center portion 62 communicating with the outer end of the lower portion 60, and a straight upper portion 64 extending upwardly from the curved center portion 62 and in a direction back towards the molding 19 of the segment. Each upper portion 64 is at an angle relative to the lower portion 60 of the hook portion so that it lies in a plane which is normal to the straight portion 50 of the bar. As seen in side elevation in FIG. 4, the moldings are formed on the bars such that the wedges 21 thereof form a selected obtuse angle with the lower portion 60 of the hook portion 52b so that they project vertically upwardly in the upper reach of the conveyor.

In a specific example of the construction of each of the segments 17, the bar thereof has a diameter of $\frac{1}{2}$ inch and the straight cylindrical sections 54 of the molding have an outer diameter of approximately $\frac{3}{4}$ of an inch. The wedges 21 have rounded side surfaces which are inclined at 45° relative to adjacent sections 54 and have rounded upper tips which are about an inch above the axis of the bar. The spacing between the tips of the wedges is about 3 inches. The hook portions 52a and 52b are formed such that the segments of the conveyor are longitudinally spaced by approximately 2 inches. The selected obtuse angle formed between the straight lower portion 60 of the hook portion of each bar and the plane of the wedges thereon is approximately 110°.

According to the critical aspect of the present invention, and as may be best seen in FIG. 4, the hook portions 52a, 52b of the segments 17 are hooked on the straight portions 50 of the adjacent trailing bars; that is to say, the segments are interconnected so that the straight portion 50 of each bar is disposed forwardly of the hook portions 52a, 52b thereof (when such bar is in the upper reach of the conveyor). With such a chain arrangement, the wedges 21 of the moldings on the bars remain vertically oriented until they are at the top-dead-center position over the drive sprockets and thereafter the wedges are caused to rock rearwardly relative to the axes of the straight portions 50 of the bars as they pass over the top-dead-center position of the drive sprockets 40a, 40b. The manner in which the wedges rock rearwardly counter to the direction of their arcuate travel is shown in FIG. 4. The top-dead-center position of the drive sprockets is indicated by the line T—T in FIG. 4. The radial line L—L indicates the end of the arcuate path beyond top-dead-center during which the wedges rock rearwardly; such line L forms an angle B with the line T—T that is equal to the tooth pitch of the drive sprockets. It will be seen in FIG. 4 that the molding 19' is positioned at the top-dead-center position of the drive sprockets. The wedges 21 thereof are still vertically oriented, as are all of the other wedges that are disposed in the upper reach of the conveyor. Thus, the wedges of molding 19' are radially aligned with the drive sprocket. The wedges of the adjacent downstream molding 19" will be seen to be rearwardly skewed by an angle S from the radial line L—L through the drive sprockets. It will thus be understood that when the molding 19' subsequently moves through an arcuate path corresponding to the tooth pitch angle B to the position of the molding 19", the wedges of the molding 19' will rock toward the vertical in a counter-clockwise direction through the angle S.

In the aforementioned example wherein the bars 18 have an outer diameter of $\frac{1}{2}$ inch, the bars are spaced by 2 inches along the conveyor and the sprockets have ten teeth. Thus, the tooth pitch angle B is 36°, and the wedges of the moldings rock rearwardly through an angle S of approximately 18° from the radial line L—L. It will be seen therefore that the wedges pivot forwardly a total of only 18° as they traverse through the 36° arc past the top-dead-center position over the drive sprockets.

It has been found that the channelizing conveyor 14 of the present invention throws the rocks, dirt clods and potatoes from its discharge end through relatively uniform trajectories so that the potatoes fall on the takeaway conveyor 16 and so that the rocks and clods hit appropriate spots on the paddles 26 to be effectively rejected. It is felt that such uniformity in the trajectories stems from the facts that the wedges 21 remain vertically oriented until after they are carried past the top-dead-center position at the drive sprockets and that the wedges thereafter rock rearwardly relative to the drive sprockets as they are carried through an orbital path around the drive sprockets through an arc equal to the tooth pitch of the sprockets. Due to the continued upright orientation of the wedges just prior to the top-dead-center position, the trailing end of a potato resting on a wedge is not disturbed by any forward pivoting of the wedge, as would happen if the segments were interconnected in the conventional manner with the hooks leading the straight portions of the segments. Also, the rearward rocking of the wedges at the discharge position in effect causes the wedges to tend to fall directly vertically downwardly away from the potatoes, rocks and clods resting thereon as the wedges traverse through the aforementioned arcuate path beyond the top-dead-center position above the drive sprockets, whereby relatively less destabilizing influence is exerted by the wedges on the potatoes, rocks and clods as they are ejected from the conveyor.

The segmented channelizing conveyor 14 has a further major advantage over the aforementioned prior art sorting apparatus of the type that includes a solid belt channelizing conveyor in that loose debris, including small rocks and dirt, will be immediately separated as it is fed from the supply conveyor 12. Due to such separation, the paddle assemblies 25 and the detector units 34 will remain relatively clean, thus assuring proper operation of the detector units and the paddle assemblies with relatively infrequent maintenance. Another advantage of the conveyor 14 relative to the prior at ribbed belt conveyor is that the segmented bar conveyor is much more rugged and will not stretch during use.

Although the best mode contemplated for carrying out the present invention has been herein shown and described, it will be apparent that modification and variation may be made without departing from what is regarded to be the subject matter of the invention.

What is claimed is:

1. An improved sorting apparatus for separating matter such as rocks, dirt clods and small debris from root crops including a supply conveyor, a channelizing conveyor having an upper reach positioned to receive crops, rocks, dirt clods and small debris from the supply conveyor and having a discharge end whereat the crops, rocks and clods are ejected through transversely spaced trajectories toward a receiving area, and a plurality of means mounted in transversely spaced relationships between the discharge end of the channelizing conveyor and the receiving area for selectively extending into said trajectories to deflect rocks and clods from falling toward said receiving area to thereby separate the same from the root crops, the improvement comprising: said channelizing conveyor including an endless series of interconnected bars, each of said bars including a generally straight portion that extends transversely of its path of travel and hook portions formed at the ends thereof which extend generally parallel to its path of travel, each of said bars having a molding formed thereon, each molding having uniformly spaced projections that extend uprightly at a selected orientation in the upper reach of said channelizing conveyor with the molding projections of adjacent bars being aligned in the direction of travel to thereby form means for channelizing the rocks, dirt clods and crops, said bars being interconnected such that the hook portions of each bar engage the transversely extending straight portion of the adjacent trailing bar, said channelizing conveyor further including sprockets at said discharge end upon which said bars are engaged, said interconnection of said bars causing the molding projections of each bar to remain in said upright orientations until they traverse past the top-dead-center position of said sprockets.

2. The improved sorting apparatus according to claim 1 wherein said hook portions of each bar extend downwardly from the axis of the straight portion of the bar when the bar is in a horizontal conveying reach of the conveyor prior to being received on said sprockets.

3. The improved sorting apparatus according to claim 2 wherein said hook portions of each bar extend inwardly at each end of the bar.

4. The improved sorting apparatus according to claim 1 wherein said molding projections on each bar have opposing side surface portions that are inclined and diverge outwardly and upwardly to thereby facilitate channelizing of the crops, rocks and clods between said opposing side surface portions.

* * * * *